UNITED STATES PATENT OFFICE 2,511,695

COPOLYMER LIQUID POLISH

William B. Canfield, Montclair, N. J., assignor, by direct and mesne assignments, of one-half to Ellis Foster Company, a corporation of New Jersey, and one-half to Montclair Research Corporation, a corporation of New Jersey No Drawing. Application December 8, 1945, Serial No. 633,871

2 Claims. (Cl. 260—28.5)

The present invention relates to a new and improved liquid dressing for leather goods. More particularly, it relates to a liquid dressing of which the principal constituent is an aqueous, resinous dispersion having waxes incorporated therein.

The present invention proposes to provide a leather dressing wherein the resinous aqueous disperion is a copolymer of a liquid polymerizable compound containing a single $>C=CH_2$ group per molecule and a polymerizable ester containing more than one double bond per molecule such as diallyl maleate. It is a further object of this invention to provide a liquid leather dressing wherein the said liquid resinous dispersion is admixed with a hard wax in such proportions as to give a leather dressing which air dries to a hard, flexible, glossy film.

Additional objects of this invention will become apparent from the description which hereinafter follows.

The objects of the present invention are attained by employing as the essential constituent in the leather dressing an aqueous dispersion of a cross-linked copolymer in which a polyfunctional unsaturated ester is combined with one or more compounds capable of linear polymerization.

A diester of a dicarboxylic acid with a monohydric beta-unsaturated alcohol containing from 3 to 4 carbon atoms, and one or more compounds capable of being polymerized and containing a single $>C=CH_2$ group per molecule, are mixed together in definite proportions with an emulsifying agent, catalyst, and water and are charged into a reactor equipped with a water condenser, thermometer, and mechanical agitator. The pH of the mixture is adjusted to 7. The reaction mixture is heated at a preferable temperature of 85–90° C. for 3 to about 12 hours by means of a hot water bath while agitating rapidly until a sample of the dispersion when spread on a glass plate air dries to a hard water-repellent film in about 15 minutes.

Suitable liquid polymerizable compounds containing a single $=CH_2$ group per molecule are styrene, vinyl esters (e. g., vinyl acetate) and alkyl esters of acrylic and methacrylic acid (e. g., methyl, ethyl, butyl, hexyl, octyl, decyl and dodecyl acrylate or methacrylate). The polyfunctional unsaturated esters include the neutral esters of dicarboxylic acids such as diallyl maleate, diallyl fumarate, diallyl itaconate, diallyl citraconate, diallyl phthalate, diallyl adipate, diallyl endomethylene-tetrahydrophthalate, dimethallyl maleate, dimethallyl sebacate, dicrotyl maleate, and the like.

The following are illustrative examples of the invention.

EXAMPLE 1

A leather dressing suitable particularly as a shoe polish was made by mixing an aqueous resinous dispersion, an aqueous wax dispersion and a black dyestuff.

*Resin dispersion A*

|  | Parts |
|---|---|
| Monomeric butyl methacrylate | 11.25 |
| Monomeric methyl methacrylate | 11.25 |
| Monomeric diallyl maleate | 7.5 |
| Duponol | 1.5 |
| 30% aqueous hydrogen peroxide | 6 |
| Water | 90 |

Mixed together in a three-neck flask equipped with a water-cooled condenser, thermometer, and agitator and heated by means of a hot water bath. Heating is continued at 85–90° C. for 4 hours. A film of the resulting dispersion air-dries to a hard, clear, flexible, water-repellent film in 15 minutes.

*Wax dispersion B*

A carnauba wax dispersion was prepared in a manner well known to those skilled in the art and having the following formula:

|  | Parts |
|---|---|
| Carnauba wax | 60 |
| Oleic acid | 12 |
| Morpholine | 7.5 |
| Tergitol | 2.25 |
| Water | 360 |

A shoe dressing having the following proportions was prepared:

|  | Parts |
|---|---|
| Aqueous resinous dispersion A | 100 |
| Carnauba wax dispersion B | 29.4 |
| Dye (Erie Black GXOO conc.) | 2.94 |
| Water | 66.6 |

The liquid resinous-wax shoe dressing, when applied to unfinished leather, gave a hard, glossy, flexible, water-repellent finish to the leather. (Duponol and Tergitol are trade names for higher fatty alcohol sulfates.)

The liquid resinous-wax shoe dressing disclosed in the present invention may be prepared in a one-step process in which the monomers, polymerization catalyst, emulsifying agent, water and wax dispersion are co-reacted according to the following formula to secure a liquid shoe dressing.

EXAMPLE 2

| | Parts |
|---|---|
| Monomeric butyl methacrylate | 11.25 |
| Monomeric methyl methacrylate | 11.25 |
| Monomeric diallyl maleate | 7.5 |
| 30% aqueous hydrogen peroxide | 6 |
| Duponol | 1.5 |
| Dye (Erie Black GXOO conc.) | 3.45 |
| Water | 91.5 |
| Carnauba wax dispersion (B) | 33 |

The reactants were charged together in a three-neck flask equipped with a water-cooled condenser, thermometer, and stirrer and heated by means of a hot water bath at 85–90° C. for 8 hours to secure a homogeneous liquid dressing.

The liquid dressing when applied to black leather shoes air-dried in 10 minutes to a hard, glossy, flexible, water-repellent finish.

The liquid dressings of the present invention may be applied by spraying or brushing the leather surface.

An exceedingly important feature of the present invention is the discovery that only particular proportions of the monomers copolymerized in the aqueous resinous dispersion are applicable in leather dressings. The monomers in certain proportions give cloudy films, whereas other proportions give clear films. The following aqueous resinous dispersions were prepared according to the procedure of Example 1. Films poured and dried of each dispersion are described in the following table.

Table

| Example | Butyl Methacrylate | Methyl Methacrylate | Diallyl Maleate | Description of Film |
|---|---|---|---|---|
| | Per cent | Per cent | Per cent | |
| 3 | 90 | 0 | 10 | Clear, hard. |
| 4 | 80 | 0 | 20 | Do. |
| 5 | 70 | 0 | 30 | Cloudy, hard, poor strength. |
| 6 | 50 | 50 | 0 | Cloudy, no strength. |
| 7 | 75 | 0 | 25 | Clear, hard. |
| 8 | 45 | 45 | 10 | Do. |
| 9 | 40 | 40 | 20 | Do. |
| 10 | 61.75 | 3.25 | 35 | Do. |
| 11 | 43.75 | 18.75 | 37.5 | Do. |
| 12 | 51.75 | 5.75 | 42.5 | Cloudy, fair strength. |
| 13 | 37.5 | 25 | 37.5 | Hazy, poor strength. |
| 14 | 90 | 5 | 5 | Clear, hard. |
| 15 | 42.3 | 51.7 | 6 | Do. |
| 16 | 50 | 25 | 25 | Do. |
| 17 | 50 | 10 | 40 | Do. |
| 18 | 30 | 10 | 60 | Cloudy, no strength. |
| 19 | 20 | 40 | 40 | Cloudy, poor strength |
| 20 | 81.2 | 14.3 | 4.5 | Clear, hard. |

The above table illustrates the fact that particular proportions of the polyfunctional polymerizable ester are necessary in the copolymerization of such esters on mixture with one or more polymerizable compounds containing a single $C=CH_2$ group per molecule. In general, when the polyfunctional polymerizable ester (diallyl maleate, etc.) is present in the copolymer in proportions between about 1% and about 45% by weight, the dried film is clear and strong. Those examples in the above table wherein the proportions are in this range, when mixed with a wax emulsion and dyestuff, formed satisfactory and improved leather dressings. Suitable waxes are carnauba, candelilla, ouricury, ceresin, paraffin, etc., the wax being present in proportions between about 5% and 40% of the copolymer and contributing durability and proper gloss to the film. In the above examples methyl methacrylate is used primarily to give greater hardness of film, butyl methacrylate to give toughness and flexibility, and diallyl maleate to crosslink the linear mixed methacrylic ester polymers to produce insolubility. In this particular selection of ingredients the butyl methacrylate preferably constitutes a major proportion of the mixture of methacrylates. Many other combinations of monomers are obviously possible to use for the formation of liquid leather dressings provided the proportions are in the stated range.

EXAMPLE 21

The following leather dressing will illustrate other modifications of the present invention:

| | Parts |
|---|---|
| Dodecyl methacrylate | 15 |
| Ethyl acrylate | 5 |
| Diallyl phthalate | 5 |
| Methyl methacrylate | 5 |
| 30% aqueous hydrogen peroxide | 2.5 |
| Duponol | 1.5 |
| Water | 90 |

The above reactants were mixed together in a three-neck flask equipped with a thermometer, water-cooled condenser, and stirrer and heated by means of a hot water jacket. Heating at 85–90° C. was carried out for 10 hours. The resulting aqueous, resinous dispersion air-dried to a clear, extremely flexible film.

To the above aqueous resinous dispersion was added:

| | Parts |
|---|---|
| Dye (Erie Black GXOO conc.) | 4.0 |
| Carnauba wax dispersion (B) | 79 |

When mixed together at 60° C. a uniform shoe dressing was secured. The shoe dressing was applied to black leather in the form of a liquid polish. After one coat a glossy, flexible, hard polish was imparted to the leather. The polish possessed a surprising degree of water-repellency.

Numerous catalysts may be employed in the preparation of these aqueous resinous dispersions such as 30% aqueous hydrogen peroxide, the salts of peracids such as sodium persulphate, ammonium persulphate, potassium persulphate, and the like.

Among the dispersing agents adapted to the preparation of the aqueous resinous dispersions are higher fatty alcohol sulfates such as Duponol, triethanolamine oleate, castile soap, and the like.

The present invention, though emphasizing a new type of aqueous resinous dispersion, is a combination of the said dispersion with a hard wax dispersion to provide a liquid leather dressing for shoes and leather goods of all kinds where an easy method of polishing such leather goods is desired. The coating thus imparted to the leather surface is glossy, flexible, and hard. It possesses sufficient water-repellency such that when exposed to hard rain, the leather will retain the appearance of the original dressing.

To those skilled in the art, it will be at once appreciated that many obvious changes may be made in the above specification without departing from the scope of the same.

I claim:

1. A liquid leather dressing consisting of an aqueous dispersion containing carnauba wax, and an emulsion copolymer of diallyl maleate and a mixture of butyl methacrylate and methyl methacrylate, the butyl methacrylate constituting 50% of the mixture of methacrylates, the diallyl maleate 25% of the weight of the copolymer and the wax 17% of the copolymer.

2. A liquid leather dressing consisting of an aqueous dispersion containing carnauba wax, and an emulsion copolymer of diallyl maleate and a mixture of butyl methacrylate and methyl methacrylate, the butyl methacrylate constituting 50% of the mixture of methacrylates, the diallyl maleate 25% of the weight of the copolymer and the wax from 5% to 40% of the copolymer.

WILLIAM B. CANFIELD.

REFERENCES CITED

The following references are of record in the file of this patent:

UNITED STATES PATENTS

| Number | Name | Date |
|---|---|---|
| 2,332,896 | D'Alelio | Oct. 26, 1943 |
| 2,067,234 | Gordon et al. | Jan. 12, 1937 |